Patented Oct. 2, 1951

2,570,024

UNITED STATES PATENT OFFICE 2,570,024

PRODUCTION OF SUBSTITUTED BARBITURIC ACIDS AND INTERMEDIATES THEREFOR

Paul Charpentier, Choisy-le-Roi, France, assignor to Societe des Usines Chimiques Rhone-Poulenc, Paris, France, a French body corporate No Drawing. Application November 17, 1949, Serial No. 128,008. In France December 20, 1948

4 Claims. (Cl. 260—257)

This invention relates to the production of organic compounds and in particular to the production of ethyl metabromophenyl ethyl malonate and to the production therefrom of 5-metabromophenyl-5-ethyl barbituric acid, i. e. the compound of the formula:

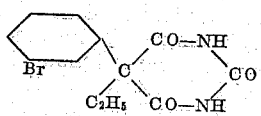

In French Patent No. 918,290 a process is described for the production of this compound in which the corresponding 5-meta-aminophenyl-5-ethyl barbituric acid is converted to the diazonium salt and this is treated with cuprous bromide, thereby replacing the original amino group by a bromine atom. However, this method has certain disadvantages. Thus, although the product obtained has a constant melting point it is impossible, even by repeated crystallisations, to obtain it in white, well crystallised form, the product remaining more or less amorphous and yellow or cream in colour.

It is an object of the present invention to provide a new method for the production of ethyl metabromophenyl ethyl malonate, which is a valuable intermediate for the synthesis of the barbiturate referred to above, and a further object is to provide a new method of synthesising the said barbiturate by a synthesis including, as one stage, the synthesis of the said ethyl metabromophenyl ethylmalonate by the new method.

According to the present invention, a process for the production of ethyl metabromophenyl ethylmalonate comprises ethylating the corresponding ethyl metabromophenyl malonate by treatment with an ethyl halide. Preferably, according to the present invention, the said ethyl metabromophenyl malonate is obtained by decomposing the product of condensation of ethyl metabromophenyl acetate with ethyl oxalate. Further, in accordance with a preferred form of the present invention the said ethyl metabromophenyl acetate is obtained by the saponification and esterification with ethyl alcohol of metabromobenzyl cyanide and preferably this latter compound is obtained by the treatment of metabromobenzyl chloride with potassium cyanide.

In the preferred form of the invention, therefore, the starting material is metabromobenzyl chloride and the process for the production of ethyl metabromophenyl ethylmalonate consists in the successive steps of treating metabromobenzyl chloride with potassium cyanide, subjecting the metabromobenzyl cyanide obtained to saponification and esterification with ethyl alcohol, condensing the ethyl metabromophenyl acetate thus obtained with ethyl oxalate, decomposing the condensation product obtained to eliminate carbon monoxide, and ethylating by treatment with an ethyl halide the decomposition product obtained.

According to a further feature of this invention, the ethyl metabromophenyl ethylmalonate thus obtained is condensed with urea and the 5-metabromophenyl-5-ethyl barbituric acid thus obtained is separated from the reaction mixture. By means of the process of this invention this substance is obtained in pure, white crystalline form.

The following examples will serve to illustrate the invention but are not to be regarded as limiting it in any way:

EXAMPLE 1

*Production of ethyl metabromophenyl ethylmalonate*

(a) PREPARATION OF METABROMOBENZYL CYANIDE

A solution of 200 g. of potassium cyanide (90–95% purity) in 200 cc. of water is heated on a boiling water bath and there is added to it a solution of 500 g. of metabromophenzyl chloride in 630 cc. of 96% ethyl alcohol. The combined solution is heated for 4 hours with stirring. The solution is then cooled and mixed with 550 cc. of water. The required compound, metabromobenzyl cyanide, separates and is removed by decantation and washed with 500 cc. of water. It is then dried over calcium chloride and purified by distillation. It distils at 135–138° C. under a pressure of 8 mm. of mercury.

(b) PREPARATION OF ETHYL METABROMOPHENYL ACETATE 450 g. of metabromobenzyl cyanide prepared as in (a) are dissolved in 930 cc. of 96% ethyl alcohol and 750 g. of sulphuric acid (66° Bé.) are gradually added with stirring. The mixture is heated for 7 hours under reflux and then cooled. The mixture is then dissolved in 2 litres of water. The required product separates and is removed by decantation and washed with 2 litres of 10% by weight aqueous sodium carbonate

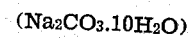

solution. It is then dried over potassium carbonate and purified by distillation. The required product, ethyl metabromophenyl acetate, distils at 132–134° C. under a pressure of 8 mm. of mercury.

(c) PREPARATION OF ETHYL METABROMOPHENYL MALONATE

A solution of sodium ethylate (25.3 g. of sodium in 253 g. of absolute ethyl alcohol) is prepared and cooled. To this is added a mixture of 243 g. of ethyl metabromophenyl acetate (prepared as in (b)) and 153 g. of ethyl oxalate and the resulting mixture is allowed to stand for 24 hours during which the sodium salt of the oxalyl derivative of ethyl metabromophenyl acetate separates from solution. A cooled mixture of 60 g. of sulphuric acid (66° Bé.), 450 cc. of water and 200 cc. of benzene is then added and the mixture stirred until the said sodium salt has disappeared. Sodium sulphate produced as a by-product is deposited and is separated by centrifuging. The remaining solution separates into layers and the benzene layer is decanted and washed with 1 litre of water and dried over sodium sulphate. The benzene is then distilled off and the residue obtained is heated first at 160° C. and then at 180° C. until all liberation of carbon monoxide has ceased. The product thus obtained is purified by distillation. It distils at 162–165° C. under a pressure of 4 mm. of mercury.

(d) PREPARATION OF ETHYL METABROMOPHENYL ETHYLMALONATE

A solution of sodium ethylate (20.8 g. of sodium in 250 cc. of absolute ethyl alcohol) is prepared and to this is added, in the cold, 260 g. of ethyl metabromophenyl malonate (prepared as in (c)) with stirring. There is then added 150 g. of ethyl iodide over a period of 2 hours and the resulting mixture is heated on a water bath for 4 hours. The excess ethyl alcohol is distilled off and the residue is dissolved in water. The required product separates and is removed by decantation, washed with water, dried over potassium carbonate and purified by distillation. It boils at 157–159° C. under a pressure of 2 mm. of mercury.

EXAMPLE II

Production of 5-metabromophenyl-5-ethyl barbituric acid 7.4 g. of sodium, 30 g. of urea and 50 g. of metabromophenyl ethyl malonate, prepared as in Example I, are added to 80 cc. of methyl alcohol (99.9% purity). The mixture is heated for 6 hours with reflux at 75–80° C., and the methyl alcohol, and the ethyl alcohol formed during the course of the reaction, are distilled off by heating to 110° C. The reaction mixture is cooled to 80° C., 50 cc. of benzene are added, the mixture further cooled and 200 cc. of water are added. The aqueous layer is decanted and the 5-metabromophenyl-5-ethyl barbituric acid formed is precipitated by adding to the aqueous liquor sufficient hydrochloric acid to make the liquor neutral to litmus. The precipitate is separated by centrifuging, washed with water and dried in an oven. It is recrystallised from butyl alcohol solution and thus obtained as a very pure white product, m. pt. 252° C.

I claim:

1. Process for the production of 5-meta-bromophenyl-5-ethyl barbituric acid which comprises treating ethyl meta-bromophenyl malonate with an ethyl halide, and reacting the product with urea.

2. Process for the production of 5-meta-bromophenyl-5-ethyl barbituric acid which comprises condensing ethyl meta-bromophenyl acetate with ethyl oxalate, decomposing the product to eliminate the elements of carbon monoxide and treating the product thus obtained with an ethyl halide and thereafter reacting the product obtained with urea.

3. Process for the production of 5-meta-bromophenyl-5-ethyl barbituric acid which comprises subjecting meta-bromobenzyl cyanide to saponification and esterification, condensing the ethyl meta-bromophenylacetate thus obtained with ethyl oxalate, decomposing the product to eliminate the elements of carbon monoxide and treating the product thus obtained with an ethyl halide, and thereafter reacting the product obtained with urea.

4. Process for the production of 5-meta-bromophenyl-5-ethyl barbituric acid which comprises treating meta-bromobenzyl chloride with potassium cyanide, subjecting the meta-bromobenzyl cyanide thus obtained to saponification and esterification, condensing the ethyl meta-bromophenyl acetate thus obtained with ethyl oxalate, decomposing the product to eliminate the elements of carbon monoxide and treating the product thus obtained with an ethyl halide, and thereafter reacting the product obtained with urea.

PAUL CHARPENTIER.

REFERENCES CITED

The following references are of record in the file of this patent:

UNITED STATES PATENTS

| Number | Name | Date |
|---|---|---|
| 2,419,865 | Weston et al. | Apr. 29, 1947 |

OTHER REFERENCES

Beilstein, Vierte Auflage, vol. 9, p. 451.
Beilstein, Vierte Auflage, vol. 2, p. 537.
Beilstein, Vierte Auflage, vol. 10, p. 860.